UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED HALOGENIZED DYE AND PROCESS OF MAKING.

963,813.  Specification of Letters Patent.  Patented July 12, 1910.

No Drawing.  Application filed July 8, 1908.  Serial No. 442,626.

*To all whom it may concern:*

Be it known that we, ALBRECHT SCHMIDT, Ph. D., and ERNST BRYK, Ph. D., citizens of the Empires of Germany and Austria-Hungary, respectively, both residing at Höchst-on-the-Main, Hesse-Nassau, Prussia, have invented certain new and useful Improvements in the Manufacture of Red Dyestuffs, of which the following is a specification.

We have found that by a careful treatment of the yellowish-red 4-di-alkoxythioindigos with halogens or halogen eliminating agents, for instance by treating with bromin in the cold, or by gently heating with chlorin, or, with special advantage, by treating with sulfurylchlorid (according to the U. S. Patent No. 812598) very fast and valuable halogenized dyestuffs are obtained.

This is a surprising fact in several respects. It was neither to be expected that the alkoxyl-groups when halogenized would behave indifferently (indeed when halogenized more strongly for instance at raised temperature there will be a decomposition), nor could it be expected that in this way pure red and not violet dyestuffs could be obtained.

Example I: 1 part by weight of 4-diethoxythioindigo $C_2H_5O:S:C=4:2:1$ is stirred with 3 parts of bromin while cooling. The mixture is allowed to stand for a while, the powdery blackish mass is diluted with the carbon tetrachlorid, is filtered off, and is then treated with a solution of bisulfite and boiled with alcohol. The dyestuff thus obtained dyes wool and cotton pure red shades of excellent fastness. In bromination, dissolving agents such as nitrobenzene, carbon tetrachlorid, water, sulfuric acid, etc. may be employed. Gentle heat may also be applied according to the desired degree of bromination.

Example II: 1 part by weight of 4-diethoxythioindigo is stirred with 4 parts of sulfuryl-chlorid and allowed to stand for a while. Here, also, dissolving agents, such as nitrobenzene, carbon tetrachlorid, etc. may be added. Further, in converting the mixture, it may be gently heated according to the desired degree of halogenation. The reaction mass is diluted with carbon tetrachlorid, filtered off and the product washed with alcohol. The dyestuff thus obtained dyes in the vat shades of a more intense red than the parent product.

Similar dyestuffs are obtained by treatment with chlorin gas.

In the place of the di-ethoxythioindigos, their leuco compounds, and other 4-oxyethers of the thioindigo, or their leuco compounds, may be used.

Having now described our invention, what we claim is:

1. The process for the manufacture of red dyestuffs, which consists in treating 4-oxyethers of the thioindigo with a halogenizing reagent at a moderate temperature.

2. As new products, the herein-described red halogenized dyestuffs, which are insoluble in water, diluted acids, diluted alkalies, alcohol and ether; but soluble in hot nitrobenzene with a yellowish-red color and in concentrated sulfuric acid with a blue color, forming with an alkaline solution of hydrosulfid a yellow vat, from which cotton is dyed in very fast red tints.

3. As a new product, halogenized 4-diethoxythioindigo, which is insoluble in water, diluted acids, diluted alkalies, alcohol and ether; but soluble in hot nitrobenzene with a yellowish-red color and in concentrated sulfuric acid with a blue color, forming with an alkaline solution of hydrosulfid a yellow vat, from which cotton is dyed in red tints.

In testimony whereof, we affix our signatures in presence of two witnesses.

ALBRECHT SCHMIDT.
ERNST BRYK.

Witnesses:
 JEAN GRUND,
 CARL GRUND.